Dec. 17, 1946.  J. ROBINSON  2,412,835
POWER TRANSMISSION
Filed Nov. 29, 1940

INVENTOR
JAMES ROBINSON
BY
*Ralph L. Truesdell*
ATTORNEY

Patented Dec. 17, 1946

2,412,835

UNITED STATES PATENT OFFICE 2,412,835

POWER TRANSMISSION

James Robinson, Detroit, Mich., assignor to Vickers Incorporated, Detroit, Mich., a corporation of Michigan Application November 29, 1940, Serial No. 367,725

5 Claims. (Cl. 103—162)

This invention relates to power transmissions, particularly to those of the type comprising two or more fluid pressure energy translating devices, one of which may function as a pump and another as a fluid motor.

The invention is more particularly concerned with a fluid pressure energy translating device adapted to function as a pump or motor in an open-circuit type of power transmission system and particularly suited for high speed operation. In systems of this character, particularly those of smaller size, which are capable of operating at speeds of several thousand revolutions per minute, considerable trouble has been encountered with air getting into the working circuit and the well-known attendant difficulties arising when this occurs. The term "pump" is used hereafter in the specification and claims as embracing both a pump and a fluid motor.

Pumps of the type having a wet case, that is, one which is normally filled with substantially idle power transmission liquid, utilize the casing as a means for collecting the fluid leaking past the piston and valve mechanism and for returning it to the expansion tank provided in the customary open-circuit system. It is frequently desirable to locate the pump at a considerable distance from the expansion tank as, for example, aboard aircraft where the pump may be located at a wing-mounted engine of the plane and the expansion tank positioned at some convenient remote place in the fuselage. In such cases it is undesirable to run a separate casing drain line between the casing and the expansion tank so that resort is had to using the pump suction line for both feeding the inlet of the pump and for receiving excess leakage fluid from the pump casing.

Where systems of this character are operated at high speed, as they usually are in aircraft installations, considerable difficulty has been experienced in keeping air out of the working circuit. Applicant has found that with systems of this character it occasionally happens that, due to the resistance of the pump suction line, the pressure therein is reduced below atmospheric by the high speed operation of the pump, and as a consequence the interior of the pump casing is correspondingly subjected to negative pressure. This permits air to be drawn into the pump casing through the oil seal at the shaft, and since the casing is connected to the pump suction line, such air is eventually delivered to the working circuit of the pump.

It is an object of the present invention to provide an improved means and method for preventing seepage of air into the working circuit of a wet casing type pump.

A further object is to provide an improved means and method for initially filling the casing of a pump of this character.

Further objects and advantages of the present invention will be apparent from the following description, reference being had to the accompanying drawing wherein a preferred form of the present invention is clearly shown.

Figure 1:
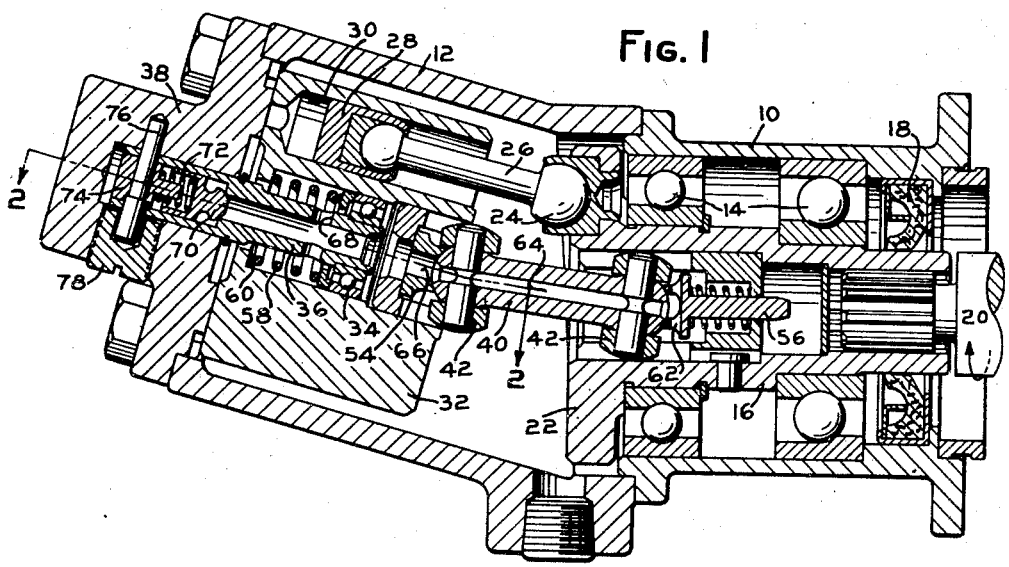
Figure 1 is a longitudinal sectional view of a wet case pump embodying a preferred form of the present invention.

Referring now to Figure 1, the pump comprises two tubular casing members 10 and 12 disposed at an angle relative to one another, the member 10 carrying anti-friction bearings 14 on which a flanged drive shaft 16 is mounted. An oil seal 18 closes the righthand end of the casing 10. The shaft 16 is adapted to be driven by the shaft of a suitable prime mover indicated at 20 and which is spline-connected to the flanged shaft 16.

The righthand end of the shaft 16 carries a flange 22 which is provided with a plurality of ball joints 24 by which piston rods 26 are articulated to the flange 22. At their opposite ends the piston rods 26 carry ball-jointed pistons 28 reciprocable in cylinder bores 30. The latter are formed in a cylinder barrel 32 which is journalled on an anti-friction bearing 34 carried by a hollow stub shaft 36. The latter is secured to a valve plate block 38 which in turn is secured to the open end of casing member 12. A Cardan shaft 40, having universal joints 42 at its opposite ends, connects the cylinder barrel 32 to the shaft 16 for conjoint rotation therewith.

The valve plate is provided with the usual annular valving surface 44 having a pair of arcuate ports 46 and 48 formed therein and communicating with pressure and suction connections 50 and 52. The Cardan shaft 40 is urged to the left against a spherical abutment block 54 by a spring-pressed abutment block 56 at its righthand end. The cylinder barrel 32 is urged into contact with the valve plate 38 by a spring 58 which is positioned between the bearing 34 and shoulder 60 at the lefthand side of the block 32.

For the purpose of preventing drawing in of air to the interior of the pump casing there is provided an outlet path for the leakage oil which is constantly being fed into the interior of the casing at a slow rate by leakage between the valve plate and cylinder barrel as well as leakage past the piston 28. The outlet provided for this oil comprises a cross bore 62 formed in the block 56 and communicating with a longitudinal passage 64 in the Cardan shaft 40. This passage in turn communicates with a passage 66 in the block 54 which communicates with the hollow interior of stub shaft 36. The latter is also provided with cross bores 68 which receive leakage flowing radially inward across the pressure surface 44 of the valve plate 38.

Mounted in the lefthand end of the hollow stub shaft 36 is a relief valve 70 which is backed by a light spring 72. The spring abutment block 74 and the stub shaft 36 are locked to the valve plate 38 by a pin 76 which is accessible by a pipe plug 78. The relief valve 70 discharges through an angular cross bore 80 which communicates with the suction port 52.

Figure 2:
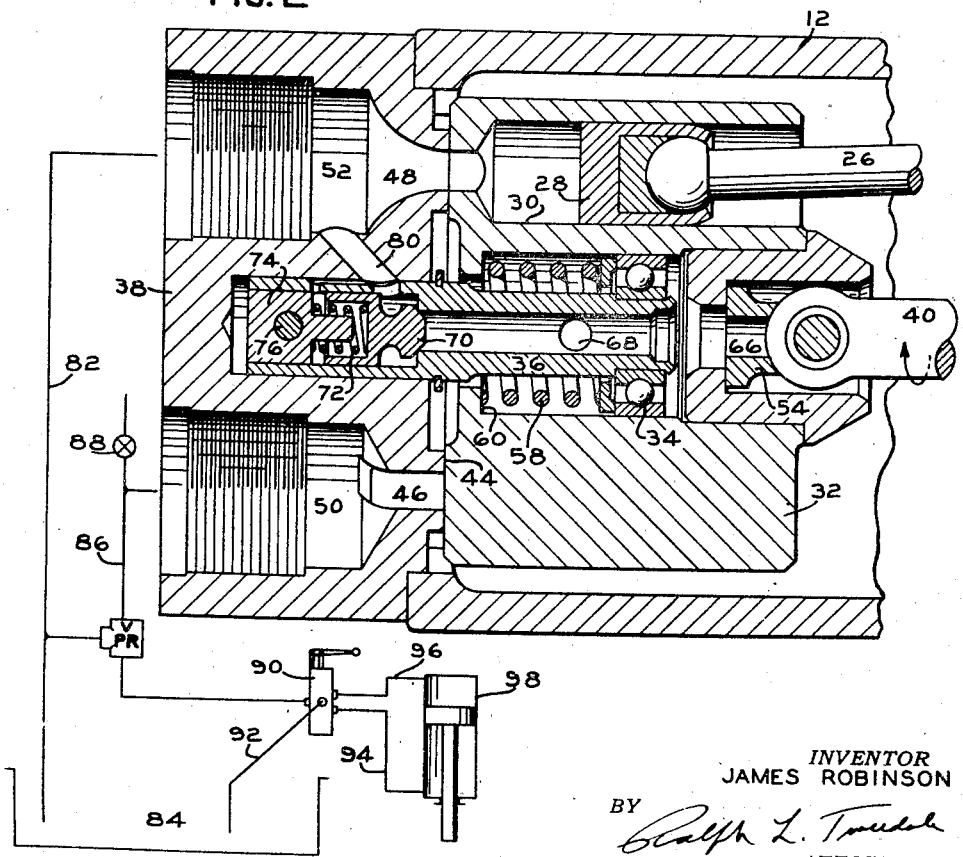
Figure 2 is a fragmentary sectional view taken on line 2—2 of Figure 1 and showing diagrammatically a conventional open-circuit type of power transmission system in which the pump is connected.

The pump described may be connected in the usual open-circuit hydraulic power transmission system as illustrated in Figure 2. Thus the suction port 52 is connected by a suction conduit 82 with the usual expansion tank 84. The delivery connection 50 connects by means of a conduit 86 having a filling and air-bleed valve 88 at a high point therein with the pressure port of a conventional four-way valve 90. The latter has its tank port connected by a conduit 92 with the tank 84 and its cylinder ports connected by conduits 94 and 96 with the opposite ends of a fluid motor 98.

In operation, the working circuit may be filled with oil in the customary manner through the valve 88 after which the pump may be placed in operation withdrawing oil from the tank 84 through the suction conduit 82 and delivering it from delivery port 50 through pressure conduit 86. Customarily the valve 90 is left in neutral position in which the pump is bypassed, and the pump is operated for some time until the air has been completely removed from the system as evidenced by the inability to bleed air from the pressure line 86 when valve 88 is cracked open. During this operation of the pump, any air originally present in the pump casing will be transferred to the working circuit in the following manner:

As leakage occurs from the working circuit to the interior of the casing, the body of liquid is gradually built up therein which at first, by its mere presence in the casing, tends to displace air out through the outlet path beginning at the passage 62 until the relief valve 70 is reached. As more and more liquid enters the casing, this liquid will be churned around by the revolving parts setting up a centrifugal action keeping the liquid in the radially outermost portion of the casing and pocketing any air present in the central portion of the casing. As the liquid continues to enter the casing, the pressure builds up until the relief valve 70 opens, at which time a small flow takes place continuously through the relief valve and passage 80 to the suction port 52. It will be seen that no liquid can escape through this path until all the air in the casing has been displaced since, due to the different densities of the liquid and the air, the centrifugal force will maintain the liquid in the outer part of the casing until all of the air has been forced out through the outlet passage 62. From this point on, the leakage liquid will begin flowing through the outlet path and continue so to flow as long as the pump keeps operating.

Due to the back pressure maintained by relief valve 70, any negative pressure created in suction port 52 by high speed operation and by the resistance of conduit 82 can never reach the interior of the casing 12 so that, in order for oil to escape from the casing, it must build up a pressure sufficient to overcome relief valve 70. This pressure is, of course, built up by the continuing flow of leakage oil into the casing which, though small, is nevertheless incessant and requires a path for escape or it will build up tremendous pressure. In this manner the pressure in the casing will be maintained slightly positive or above atmospheric so that the pressure on the lefthand side of oil seal 18 is always above that on the righthand side. This insures that no air will be drawn in through the seal and that a small seepage will take place through the seal sufficient to keep the latter lubricated and prevent its burning at the high speeds of operation customarily encountered.

While the form of embodiment of the invention as herein disclosed constitutes a preferred form, it is to be understood that other forms might be adopted, all coming within the scope of the claims which follow.

What is claimed is as follows:

1. In a reciprocating piston pump of the type having a sealed casing of fixed liquid volume and having separate suction and delivery ports the combination of means forming a connection between the casing and the suction port of the pump and constituting the sole exit from the casing and a pressure responsive valve in said connection adapted to confine all leakage fluid to the casing until a predetermined positive pressure is reached in the casing, said connection leading from a point near the center of revolution of the pump parts whereby all air originally present in the casing will be discharged from the delivery port during initial operation of the pump.

2. In a reciprocating piston pump of the type having a sealed casing of fixed liquid volume and having separate suction and delivery ports and rotating working parts disposed within and discharging leakage fluid into the casing the combination of an outlet constituting the sole exit from said casing and communicating with said suction port and a pressure responsive valve in said outlet for maintaining a slight positive pressure in said casing.

3. In a reciprocating piston pump of the type having a sealed casing of fixed liquid volume and having separate suction and delivery ports and a rotary cylinder barrel journalled on a hollow pin mounted on a wall of said casing, the combination of means forming a connection between the casing and the suction port of the pump and including said hollow pin as a part thereof and a pressure responsive valve in said hollow pin adapted to confine all leakage fluid to the casing until a predetermined positive pressure is reached in the casing.

4. In a reciprocating piston pump of the type having a sealed casing of fixed liquid volume and having separate suction and delivery ports and having a rotary cylinder barrel provided with a plurality of axially disposed cylinder bores disposed within and discharging leakage fluid into the casing, the combination of an outlet constituting the sole exit from said casing and communicating with said suction port and a pressure responsive valve in said outlet for maintaining a slight positive pressure in said casing.

5. In a reciprocating piston pump of the type having a sealed casing of fixed liquid volume and having separate suction and delivery ports and having a rotary cylinder barrel provided with a plurality of axially disposed cylinder bores disposed within and discharging leakage fluid into the casing, the combination of a single outlet from said casing and communicating with said suction port and a pressure responsive valve in said outlet for maintaining a slight positive pressure in said casing, said outlet leading from a point adjacent the center of rotation of the barrel whereby any air present in the casing is forced to said outlet by centrifugal force in conjunction with the pressure built up by the leakage fluid against said valve.

JAMES ROBINSON.